United States Patent
Jonsson et al.

(10) Patent No.: US 6,700,888 B1
(45) Date of Patent: Mar. 2, 2004

(54) MANIPULATING HEADER FIELDS FOR IMPROVED PERFORMANCE IN PACKET COMMUNICATIONS

(75) Inventors: Lars-Erik Jonsson, Luleå (SE); Jim Sundqvist, Luleå (SE); Krister Svanbro, Luleå (SE); Zsolt Haraszti, Kista (SE); Vicknesan Ayadurai, Hägersten (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/406,950

(22) Filed: Sep. 28, 1999

(51) Int. Cl.7 .............................................. H04L 12/56
(52) U.S. Cl. .................... 370/392; 370/395.3; 370/400; 370/471; 370/474; 370/477
(58) Field of Search ................................ 370/351, 389, 370/392, 400, 349, 395.3, 471, 474, 230, 355, 356, 352, 401, 473, 477

(56) References Cited

U.S. PATENT DOCUMENTS

| | | | |
|---|---|---|---|
| 5,293,379 A | 3/1994 | Carr ........................... 370/94.1 |
| 5,579,316 A | 11/1996 | Venters et al. ............. 370/94.1 |
| 6,104,695 A * | 8/2000 | Wesley et al. ............... 370/216 |
| 6,115,750 A * | 9/2000 | Dillon et al. ................ 709/235 |
| 6,208,651 B1 * | 3/2001 | Van Renesse et al. ...... 370/392 |
| 6,314,095 B1 * | 11/2001 | Loa .............................. 370/352 |
| 6,330,614 B1 * | 12/2001 | Aggarwal et al. ........... 709/236 |
| 6,338,131 B1 * | 1/2002 | Dillon ......................... 712/201 |
| 6,408,001 B1 * | 6/2002 | Chuah et al. ................ 370/392 |

OTHER PUBLICATIONS

Stephen J. Perkins and Matt W. Mutka; "Dependency Removal for Transport Protocol Header Compression over Noisy Channels"; XP–000742093; Publication Jun. 8, 1997; pp. 1025–1029.
EPO Search RS 103841; completed Feb. 24, 2000.

* cited by examiner

*Primary Examiner*—Dang Ton
*Assistant Examiner*—Inder Pal Mehra

(57) ABSTRACT

In packet communication paths that include header compression, header fields of packets to be communicated are altered. The alteration of the header fields does not disturb their functionality, and is transparent to the header compression scheme of the packet communication path. The altered header fields are provided for compression by the header compression scheme, resulting in improved performance of the header compression scheme. Performance improvements can also be achieved in packet communication paths that do not use header compression, by violating the integrity of header fields in packets to be transmitted over the packet communication path.

12 Claims, 6 Drawing Sheets

MANIPULATING HEADER FIELDS FOR IMPROVED PERFORMANCE IN PACKET COMMUNICATIONS

FIELD OF THE INVENTION

The invention relates generally to packet communications and, more particularly, to manipulation of header fields for improved performance in packet communications.

BACKGROUND OF THE INVENTION

Due to the tremendous success of the Internet, it has become a desirable but challenging task to make use of the Internet Protocol, or IP (See Jon Postel, *Internet Protocol*, DARPA RFC 791, September 1981, incorporated herein by reference; and Steven Deering and Robert Hinden, *Internet Protocol, Version 6 (IPv6) Specification*, IETF RFC 2460, IETF IP Next Generation Working Group, December 1998, incorporated herein by reference), over many different types of packet communication links. Internet Protocol is normally used together with a transport protocol such as Transport Control Protocol, or TCP (See Jon Postel, *Transmission Control Protocol*, DARPA RFC 761, January 1980, incorporated herein by reference), User Datagram Protocol, or UDP (See Jon Postel, *User Datagram Protocol*, DARPA RFC 768, August 1980, incorporated herein by reference), or the application level protocol referred to as Real-Time Transport Protocol, or RTP (See Henning Schulzrinne, Stephen L. Casner, Ron Frederick and Van Jacobson, *RTP: A Transport Protocol for Real-Time Applications*, IETF RFC 1889, IETF Audio/Video Transport Working Group, January 1996, incorporated herein by reference).

All of the aforementioned protocols utilize protocol headers that are inserted into each datagram (packet). A given protocol header includes various fields which all serve some important purpose, and whose information must therefore be correctly delivered to their ultimate destination.

In order to reduce the header overhead over narrow band point-to-point links, e.g., radio links, conventional header compression techniques are often used. Header compression schemes compress the amount of information transmitted in the protocol headers, thereby reducing the amount of bandwidth required when using narrow band links. The compressed headers are completely reconstructed by a header decompressor at the receiving end of the link, so the header compression/decompression process does not affect the integrity of the header fields.

It is also conventional to re-calculate and/or modify some header fields at each router. Such recalculation/modification is a purposefully designed-in part of the functionality of those header fields.

The present invention recognizes that some header fields are unnecessarily problematic for header compression/decompression operations. Some examples of such fields and why they are unnecessarily problematic are given below.

The Identification (ID) field of Internet Protocol Version 4 (IPv4) is conventionally used to identify different parts of packets that have been split into various fragments. However, the IPv4 specification only requires that the sending host must give the ID field a value that is "unique for that source-destination pair and protocol for the time the datagram will be active in the internet system". This requirement can be complied with in various well-known ways, but the present invention recognizes that, for header compression purposes, it is preferred to assign the ID field values of the headers of a given packet stream in sequentially increasing fashion (referred to hereinafter as "stream-sequential" assignment). Other well-known assignment schemes include assigning the ID field values randomly, or assigning sequentially increasing values to the ID field, but using a common counter for all outgoing packet streams from any given host (referred to hereinafter as "host-sequential" assignment). The invention recognizes that the random assignment and host-sequential assignment schemes are problematic for header compression operations.

Another IP header field that is problematic for header compression/decompression schemes is the time-to-live/hop-limit (TTL/HL) field. The value of this field is decreased by one for every hop in the path taken by a particular packet. If packets corresponding to the same packet stream alternate between different paths between source and destination, the TTL/HL field value will alternate between a typically small number of different values that do not differ much from one another. Conventionally, the TTL/HL field value must be communicated from the header compressor across the link to the header decompressor each time the TTL/HL field value changes. This disadvantageously limits the desired performance of the header compression scheme, and correspondingly increases the required bandwidth.

The present invention recognizes that it is desirable in view of the foregoing to provide for improved header compression performance with respect to header fields, for example those described above, that are problematic to the performance of header compression schemes.

The present invention provides for improved header compression performance with respect to problematic header fields by purposefully violating the integrity of such header fields in a manner that is transparent to the header compression scheme and that does not disturb the functionality of the header field. This purposeful violation of header field integrity can also be advantageously applied to packet communication paths that do not use header compression.

DETAILED DESCRIPTION

As mentioned above, conventional header compression/decompression techniques do not violate the integrity or functionality of a given header field, because the header field is (at least ideally) completely reconstructed at the decompressor. Also as mentioned above, re-calculation/modification of header fields at each router does not violate the integrity or functionality of a given field, because such recalculation/modification is in fact a part of the functionality of the field.

Any other manipulation of header fields has traditionally been forbidden for two general reasons: (1) to avoid violating the integrity of the field; and (2) to avoid disturbing the functionality of the field. Furthermore, reason (2) above has really never entered into consideration, because reason (1) has been considered to be the only reason needed to justify forbidding manipulation of header fields. However, the present invention recognizes that reason (2) above is the only substantive reason for not manipulating header fields, and the invention therefore concludes that header field manipulation and the resulting violation of header field integrity can be acceptable in certain specific situations, provided that the violation of the header field integrity does not disturb the functionality of the header field. Such header field manipulation is also referred to herein as functionality transparent header field manipulation.

Figure 1:
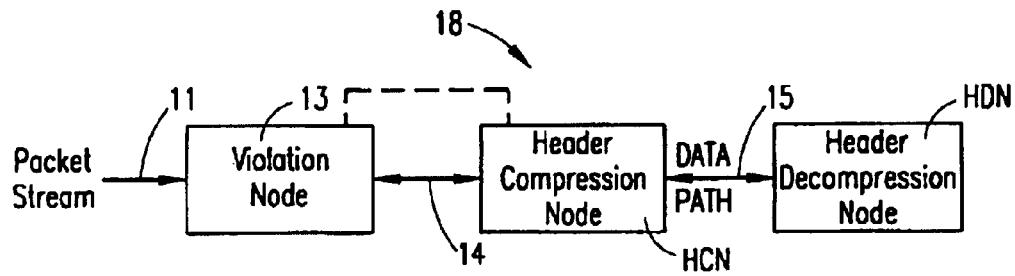
FIG. 1 diagrammatically illustrates an exemplary portion of a packet-switched communication system according to the invention.

FIG. 1 diagrammatically illustrates a pertinent portion of an exemplary packet-switched communication network according to the invention. In FIG. 1, HCN designates a packet communication node that employs header compression techniques, and HDN designates a packet communication node that employs header decompression techniques corresponding to the header compression techniques of node HCN. The packet communication nodes HCN and HDN are coupled via a data path 15, for example a narrow band point-to-point link such as a cellular radio link. In the example of a cellular radio link, the node HCN can be provided in a conventional radio transmitting station operable to communicate via the cellular radio link, and the node HDN can be provided in a conventional radio receiving station operable to communicate via the cellular radio link. As will be evident to workers in the art, the packet communication path 18 represented by nodes HCN, HDN and the data path 15 coupled therebetween can be embodied as any type of point-to-point packet communication path which utilizes header compression/decompression techniques.

Also provided in FIG. 1 is a violation node 13 which receives an input packet stream at 11, manipulates (alters) one or more header fields of one or more packets so as to violate the integrity of the header field(s), and outputs at 14 a corresponding altered packet stream including altered header fields whose integrity has been violated. The altered packet stream at 14 is input to the node HCN. The altered header fields in packet stream 14 permit performance improvements in the packet communication path 18, particularly in the header compression/decompression operations. The violation of header field integrity is transparent to the header compression scheme of the packet communication path 18, and the functionality of the altered header fields is not disturbed by the corresponding violation of header field integrity.

As will be evident from the following description, the violation node 13 can be implemented as a separate packet communication node, or can be included in node HCN, as shown by broken line in FIG. 1.

Figure 2:
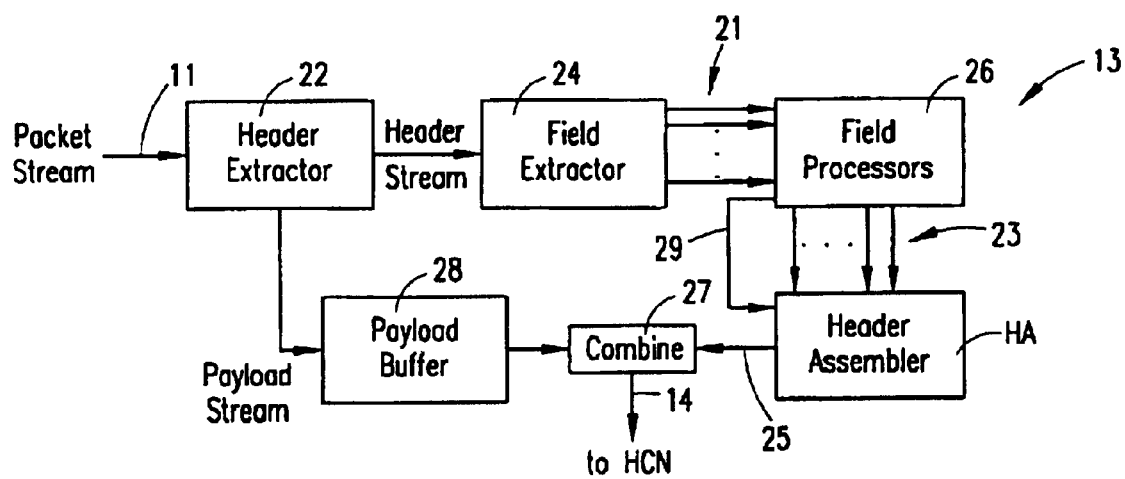
FIG. 2 diagrammatically illustrates an exemplary embodiment of the violation node of FIG. 1.

FIG. 2 diagrammatically illustrates an exemplary embodiment of the violation node of FIG. 1. In the exemplary embodiment of FIG. 2, the packet stream 11 is input to a header extractor 22 which extracts the headers from the packets of packet stream 11. The header extractor outputs a header stream, and also outputs a payload stream that results from extraction of the headers. The payload stream is input to a payload buffer 28, and the header stream is input to a field extractor 24. The field extractor 24 separates each header of the header stream into its constituent fields. These constituent header field streams are output at 21 to respective field processors of a processing portion 26. One or more of the field processors at 26 alters one or more header fields in the corresponding header field stream.

At 23, the processing portion 26 outputs the header fields, some of which have been altered by the associated field processors, to a header assembler HA which assembles an altered header stream (including one or more fields whose integrity has been violated) from the constituent header field streams received at 23. The altered header stream is output at 25 to a combiner 27 which combines the headers of the altered header stream with the corresponding payloads of the buffered payload stream as received from the payload buffer 28. The combiner 27 outputs the altered packet stream 14 illustrated in FIG. 1.

The header assembler HA can re-calculate any checksum values (e.g. IPv4 checksum or UDP/TCP checksum) covering the fields of the assembled headers, in order to accommodate any field alterations made by the field processors at 26. Alternatively, the field processors can inform the header assembler HA (e.g., at 29 in FIG. 2) when a field has been altered, so the header assembler only re-calculates checksums when necessary.

Figure 3:
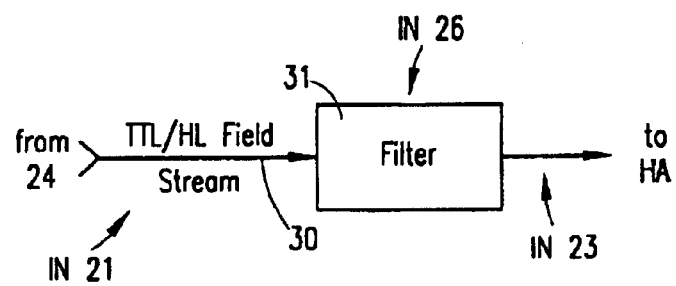
FIG. 3 diagrammatically illustrates an exemplary embodiment of a field processor of FIG. 2.

FIG. 3 diagrammatically illustrates one exemplary embodiment of a field processor of FIG. 2. In the embodiment of FIG. 3, the TTL/HL field stream, output at 21 by field extractor 24 of FIG. 2, is input at 30 to a filter 31 which applies a smoothing operation to the values of the TTL/HL field stream. The output of filter 31 is then applied to the header assembler HA of FIG. 3.

Figure 4:
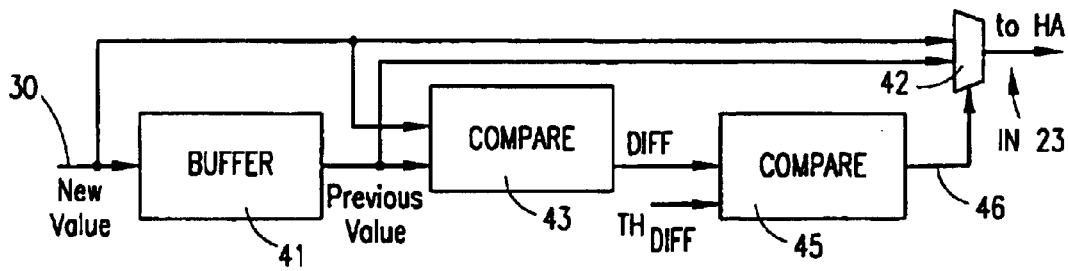
FIG. 4 diagrammatically illustrates an exemplary embodiment of the TTL/HL field filter of FIG. 3.

FIG. 4 diagrammatically illustrates an exemplary embodiment of the filter 31 of FIG. 3. Each new value of the TTL/HL field stream received at 30 is input to a buffer 41, a selector 42 and a comparator 43. The new value received at 30 is compared at 43 to the previous value, which has been buffered at 41. The output of comparator 43, DIFF, represents the difference between the new value of the TTL/HL field and the previous value of the TTL/HL field. This difference DIFF is input to a further comparator 45, which compares DIFF to a threshold value designated in FIG. 4 as $TH_{DIFF}$. If the difference output from comparator 43 exceeds the threshold value, then the output 46 of comparator 45 selects the new value to be output to the header assembler HA of FIG. 2. If the difference output from comparator 43 is less than the threshold value, then the output 46 of comparator 45 selects the previous value (from buffer 41) to be output to the header assembler HA of FIG. 2.

Figure 5:
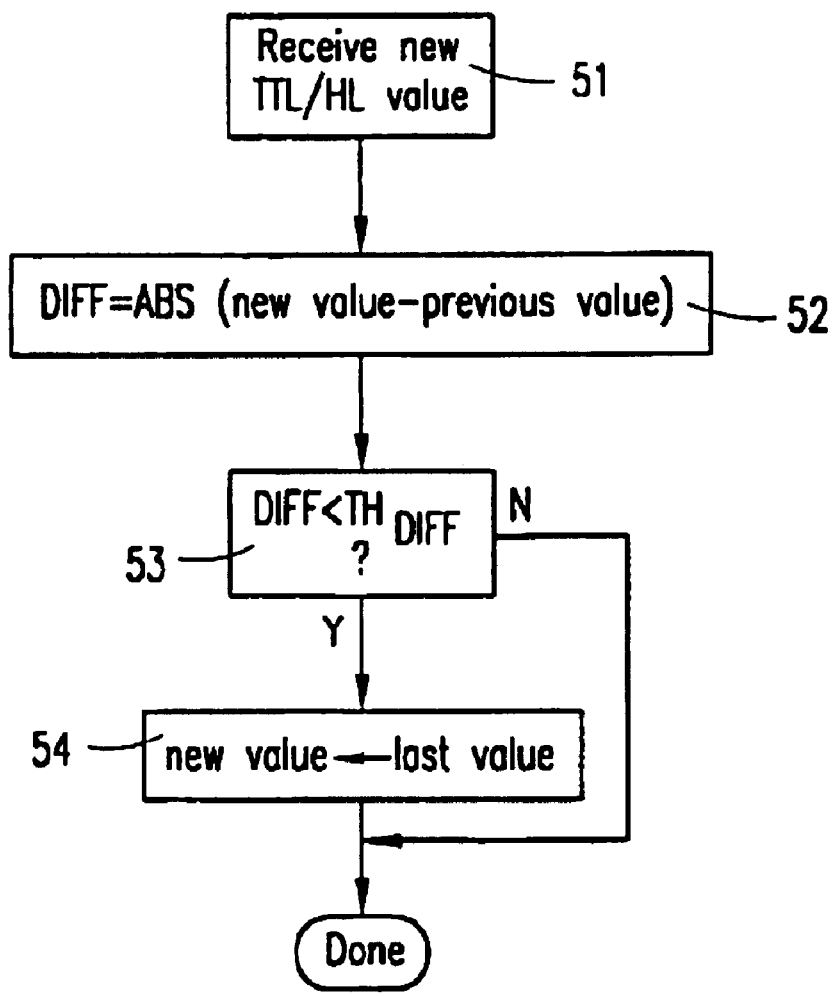
FIG. 5 illustrates exemplary operations which can be performed by the field processor embodiment of FIG. 4.

FIG. 5 illustrates exemplary operations which can be performed by the filter embodiment of FIG. 4. After the new value is received at 51, it is compared to the previous value at 52 to obtain the value of DIFF. In this embodiment, DIFF is the absolute value of the difference between the new and previous values. It is then determined at 53 whether the value of DIFF is less than the threshold value $TH_{DIFF}$. If so, then the last value is substituted for the new value at 54, otherwise, the new value is provided to the header assembler HA (see selector 42 in FIG. 4). An exemplary value of the threshold $TH_{DIFF}$ of FIGS. 4 and 5 is $TH_{DIFF}=2$. Thus, as long as the value of the TTL/HL field does not vary by more than 2 (which is often the case), then the filtering operation will set the new value equal to the previous value, thus advantageously relieving node HCN of FIG. 1 from the requirement of sending the new value to the node HDN, and thereby reducing the header overhead requirement.

Figure 6:
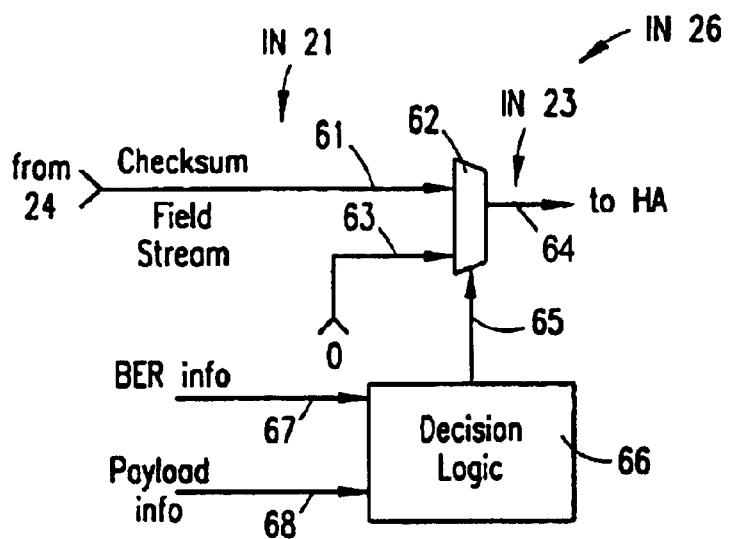
FIG. 6 diagrammatically illustrates another exemplary embodiment of a field processor of FIG. 2.

FIG. 6 illustrates another exemplary embodiment of a field processor of FIG. 2. A stream of checksum field values (e.g., UDP checksum values) received from field extractor 24 is input at 61 to a selector 62 whose other input 63 is coupled to a zero value. The output 64 of selector 62 is coupled to the header assembler HA of FIG. 2. The selector 62 has a control input 65 driven by decision logic 66 in response to bit error rate (BER) information and payload information respectively received at inputs 67 and 68 of decision logic 66.

Figure 7:
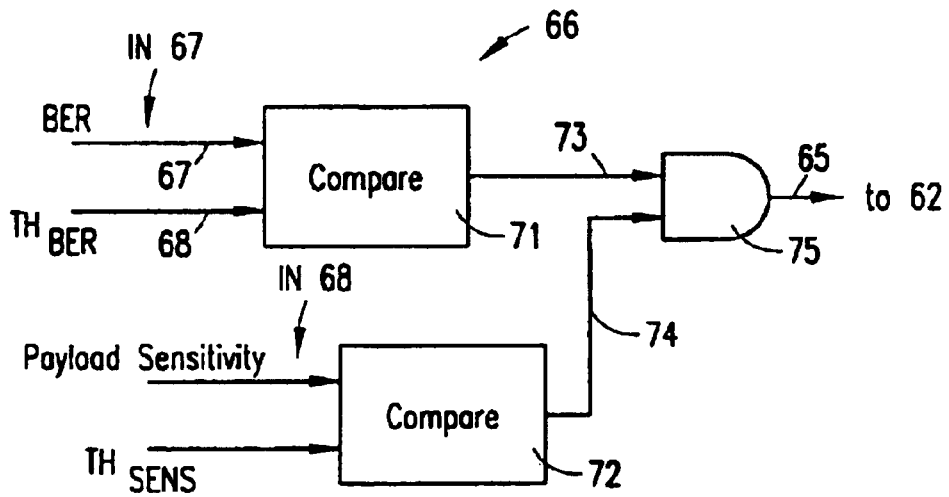
FIG. 7 diagrammatically illustrates an exemplary embodiment of the decision logic of FIG. 6.

FIG. 7 diagrammatically illustrates an exemplary embodiment of the decision logic 66 of FIG. 6. In the embodiment of FIG. 7, a comparator 71 compares the bit error rate (BER) of data path 15 to a threshold value $TH_{BER}$. Also in FIG. 7, a comparator 72 compares the bit error sensitivity of the payloads of the packet stream 11 to a threshold value $TH_{SENS}$. The output 73 of comparator 71 and the output 74 of comparator 72 are input to an AND gate 75, whose output controls the selector 62 of FIG. 6. The BER input to comparator 71 is conventionally provided from nodes such as HDN in FIG. 1 to nodes such as HCN in FIG. 1. Thus, the BER can easily be provided from the node HCN to the violation node 13 for use in the embodiment of FIG. 7. An example of the threshold value $TH_{BER}$ is $10^{-4}$. The payload sensitivity information received by comparator 72, which information is indicative of the sensitivity of the payload to bit errors, is dependent on the type of payload involved. The threshold value $TH_{SENS}$ can be emperically determined based on the desired performance.

Figure 8:
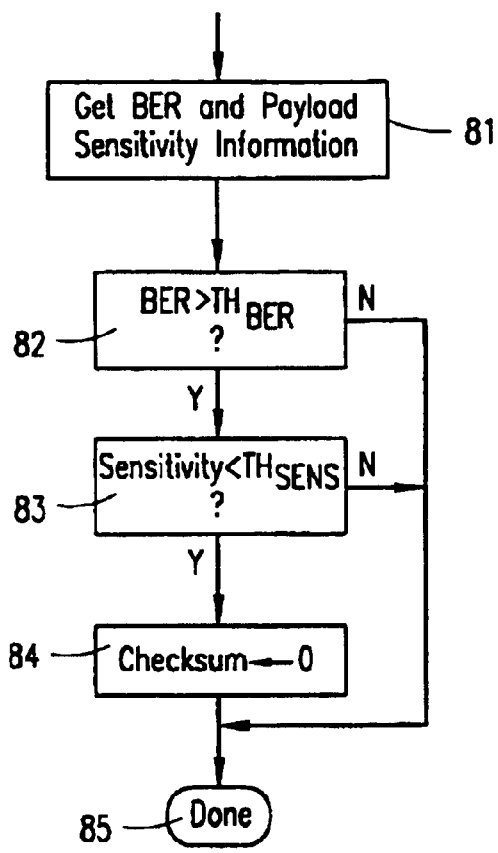
FIG. 8 illustrates exemplary operations which can be performed by the field processor embodiment of FIGS. 6 and 7.

FIG. 8 illustrates exemplary operations which can be performed by the field processor embodiment of FIGS. 6 and 7. After the BER and payload sensitivity information are obtained at 81, it is determined at 82 whether the BER exceeds the threshold value $TH_{BER}$. If so, it is then determined at 83 whether the payload sensitivity is less than the threshold value $TH_{SENS}$. If so, then the decision logic 66 controls selector 62 such that the zero value at 63 is output to the header assembler HA as the checksum field value. Thus, for example, if the data path at 15 in FIG. 1 has a relatively high bit error rate, and if the payload of the packet stream is relatively insensitive to bit errors, then the checksum field is inactivated by setting its value to zero. This reduces the header overhead in the packet communication path 18, and also ensures that packets with payload errors will be delivered to the destination application. If the BER does not exceed the threshold at 82, or if the payload sensitivity is not lower than the threshold at 83, then the selector 62 of FIG. 6 passes the checksum field value received from field extractor 24 directly to the header assembler HA (see FIG. 2).

Figure 7A:
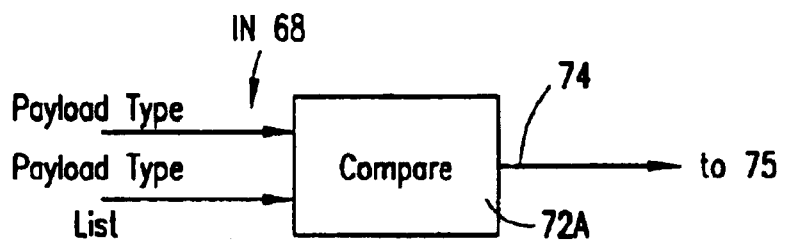
FIG. 7A diagrammatically illustrates an exemplary alternative to the embodiment of FIG. 7.
Figure 8A:
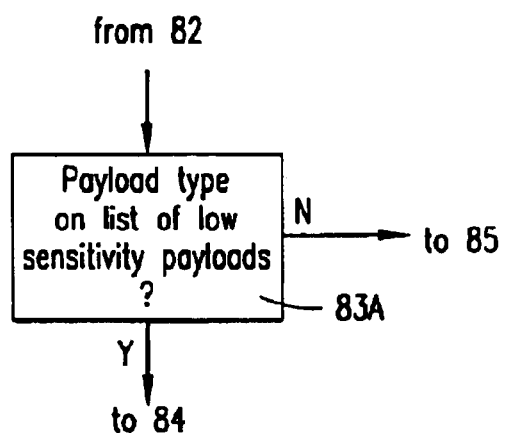
FIG. 8A illustrates exemplary operations which can be performed by the field processor embodiment of FIGS. 6 AND 7A.

In another embodiment, shown in FIG. 7A, comparator 72 of FIG. 7 can be replaced by a comparator 72A that receives information indicative of the type of payload, and compares this information to a list of payload types having low bit error sensitivity (e.g., some real-time data applications). If the comparator 72A finds the payload type in the list of low sensitivity payload types, then output 74 (see also FIG. 7) is driven active. This is also illustrated at step 83A in FIG. 8A, which step can be substituted for step 83 in FIG. 8.

The embodiments of FIGS. 6–8A are also advantageously applicable to packet communication paths that do not use header compression. The above-described benefits of delivering packets with payload errors are independent of whether or not header compression is used in the packet communication path.

Figure 9:
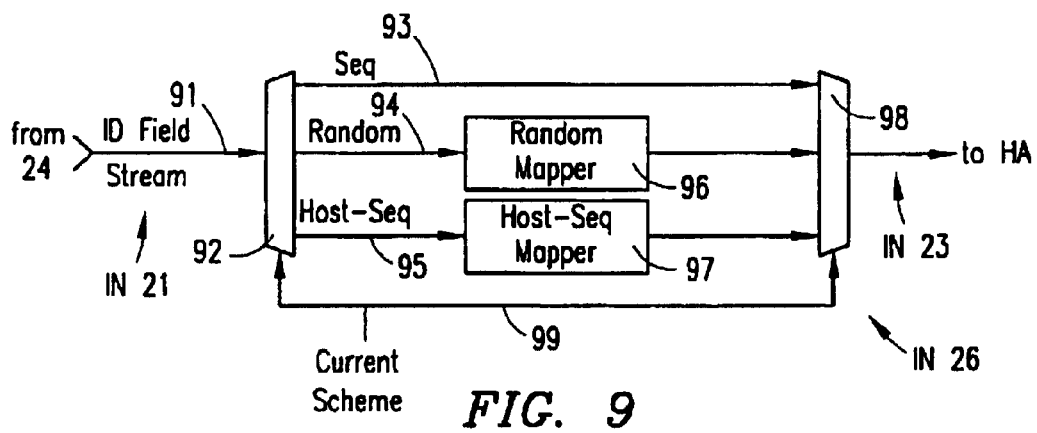
FIG. 9 diagrammatically illustrates another exemplary embodiment of a field processor of FIG. 2.

FIG. 9 illustrates another exemplary embodiment of a field processor of FIG. 2. At 91 in FIG. 9, a stream of ID field values from field extractor 24, such as IP Version 4 ID field values, is received by a selector 92. The selector 92 cooperates with a selector 98 in response to a current assignment scheme signal 99 either to route the ID field values unchanged to the header assembler HA of FIG. 2, or to route the ID field values through a mapper 96 to the header assembler HA, or to route the ID field values through a mapper 97 to the header assembler HA.

If the current assignment scheme signal at 99 indicates that the current ID field assignment scheme is stream-sequential assignment (SEQ in FIG. 9), then the field values are routed at 93 from selector 92 to selector 98 for output to the header assembler HA. If the current assignment scheme signal at 99 indicates that the current ID field assignment scheme is random assignment, then the ID field values are routed at 94 from selector 92 to a random mapper 96, which maps the randomly assigned values into stream-sequential values for output through selector 98 to the header assembler HA of FIG. 2. If the current assignment scheme control signal at 99 indicates that the current ID field assignment scheme is host-sequential assignment (HOST-SEQ in FIG. 9), then the ID field values are routed at 95 from selector 92 to a host-sequential mapper 97 which maps the ID field values from their original host-sequential assignment values to stream-sequential values for output via selector 98 to the header assembler HA.

Figure 10:
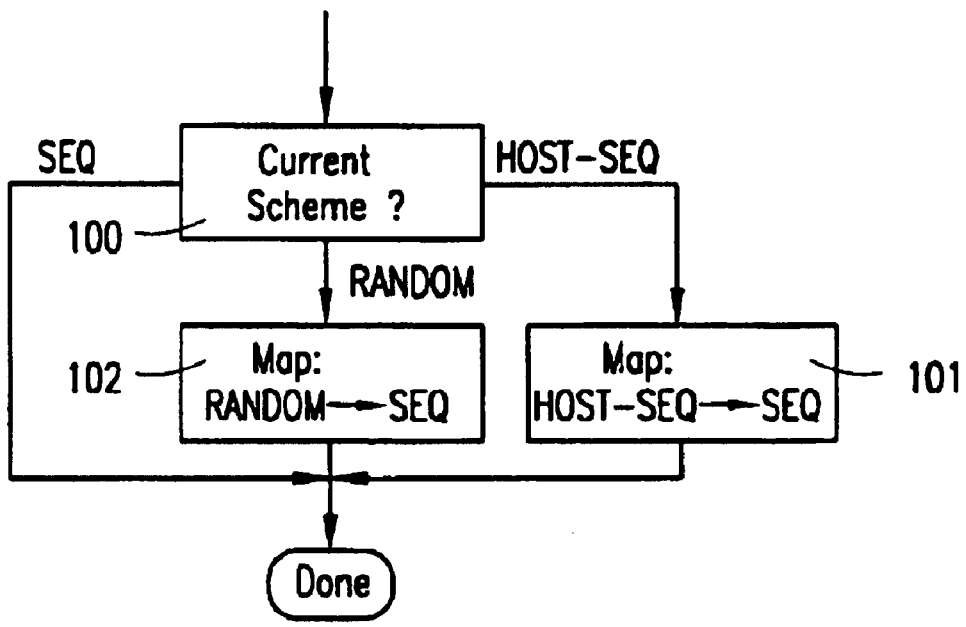
FIG. 10 illustrates exemplary operations which can be performed by the field processor embodiment of FIG. 9.

FIG. 10 illustrates exemplary operations which can be performed by the field processor embodiment of FIG. 9. It is determined at 100 whether the current ID field assignment scheme is stream-sequential, random or host-sequential. If the current scheme is stream-sequential (SEQ), then no mapping of the ID field values is necessary (corresponding to 93 in FIG. 9). If the current scheme is host-sequential (HOST-SEQ), then mapping from host-sequential assignment to stream-sequential assignment is implemented at 101. If the current scheme is random assignment, then mapping from random assignment to stream-sequential assignment is implemented at 102.

Figure 9A:
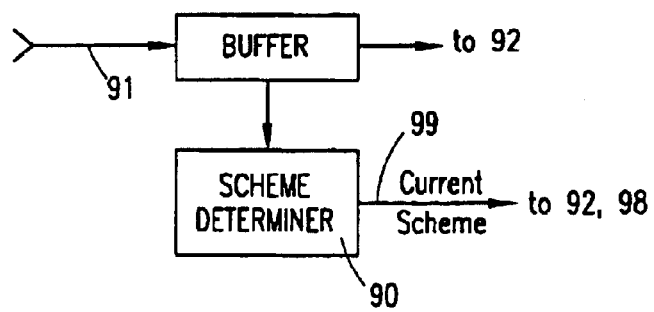
FIG. 9A illustrates the embodiment of FIG. 9 in more detail.

The current scheme information illustrated in FIG. 9 (see 99) and 10 (see 100), which indicates whether the current ID field assignment scheme is sequential, random or host-sequential, can be obtained, for example, by simply examining the ID field values in the stream at 91. Thus, a suitable amount of ID field values can be buffered, as shown in FIG. 9A, so that a scheme determiner 90 can examine the buffered field values and determine therefrom the current scheme.

The aforementioned mapping from random ID field assignment to stream-sequential ID field assignment, illustrated at 96 (FIG. 9) and 102 (FIG. 10), can be accomplished, for example, when RTP is used as the application level protocol, by altering each ID field value to match the corresponding RTP sequence number.

As can be seen above with respect to FIGS. 9 and 10, whenever the current ID field assignment scheme is random or host-sequential, both of which are problematic to the nodes HCN and HDN of FIG. 1, such ID field assignment can be mapped into stream-sequential ID field assignment, which is desirable for better performance of the header compression scheme (e.g., less header overhead required) used in the packet communication path 18 of FIG. 1.

Although exemplary embodiments of the present invention have been described above in detail, this does not limit the scope of the invention, which can be practiced in a variety of embodiments.

What is claimed is:

1. An apparatus for enhancing performance of packet communications over a packet communication path that includes a header compressor, comprising:

an input for receiving header fields of one of a plurality of packets to be communicated over the packet communication path;

a field processor coupled to said input for altering one of said header fields to produce an altered header field;

an output coupled to said field processor for outputting said altered header field to the header compressor for compression of said altered header field;

wherein said field processor selectively alters said one header field and selectively provides to said output one of said one header field and said altered header field, and wherein said field processor includes a mapper for mapping a plurality of first values respectively associated with said header fields into a corresponding plurality of second values respectively associated with said header fields, said one header field associated with one of said first values and one of said second values, said one first value differing from said one second value.

2. The apparatus of claim 1, wherein said field processor alters said one header field in response to another of said header fields.

3. The apparatus of claim 2, wherein said field processor alters said one header field responsive to a difference between respective values of said one header field and said another header field.

4. The apparatus of claim 3, wherein said input receives said header fields in a sequence, and said field processor includes a smoothing filter for performing a smoothing operation on a sequence of header field values respectively associated with the header fields of said sequence of header fields.

5. The apparatus of claim 2, wherein said header field is a time-to-live field.

6. The apparatus of claim 1, wherein said header fields are identification fields for identifying a plurality of parts of a communication to be transmitted over the packet communication path, wherein said first values are assigned according to a first identification field assignment scheme, and wherein said second values correspond to a second identification field assignment scheme that differs from said first identification field assignment scheme.

7. The apparatus of claim 1, wherein said packet communication path includes a radio link.

8. A method of enhancing performance of packet communications over a packet communication path that includes header compression, comprising:

receiving header fields of one of a plurality of packets to be communicated over the packet communication path;

altering one of the header fields to produce an altered header field, said altering step including selectively altering said one header field;

applying header compression to the altered header field, said applying step including selectively applying header compression to one of said one header field and said altered header field, and wherein said altering step includes mapping a plurality of first values respectively associated with said header fields into a corresponding plurality of second values respectively associated with said header fields, said one header field associated with one of said first values and one of said second values, said one first value differing from said one second value.

9. The method of claim 8, wherein said altering step includes altering said one header field in response to another of said header fields.

10. The method of claim 9, wherein said altering step includes altering said one header field responsive to a difference between respective values of said one header field and said another header field.

11. The method of claim 10, wherein said receiving step includes receiving said header fields in a sequence, and wherein said altering step includes performing a smoothing filtering operation on a sequence of header field values respectively associated with the header fields of said received sequence.

12. The method of claim 8, wherein said header fields are identification fields for identifying a plurality of parts of a communication to be transmitted over the packet communication path, wherein said first values are assigned according to a first identification field assignment scheme, and wherein said mapping step includes mapping said plurality of first values into a plurality of second values that correspond to a second identification field assignment scheme that differs from said first identification field assignment scheme.

\* \* \* \* \*